US008256888B2

(12) United States Patent
Horn

(10) Patent No.: US 8,256,888 B2
(45) Date of Patent: Sep. 4, 2012

(54) PRINTING LENTICULAR IMAGES AND LENSES ON PRINTERS WITH UV-CURED GEL DEPOSITION CAPABILITY

(75) Inventor: Richard Horn, Claremont, CA (US)

(73) Assignee: Xerox Corporation, Norwalk, CT (US)

(*) Notice: Subject to any disclaimer, the term of this patent is extended or adjusted under 35 U.S.C. 154(b) by 253 days.

(21) Appl. No.: 12/705,009

(22) Filed: Feb. 12, 2010

(65) Prior Publication Data
US 2011/0199595 A1    Aug. 18, 2011

(51) Int. Cl.
*B41J 2/01* (2006.01)
(52) U.S. Cl. .................. 347/102; 347/2; 355/33
(58) Field of Classification Search .......... None
See application file for complete search history.

(56) References Cited

U.S. PATENT DOCUMENTS

| 5,642,226 A * | 6/1997 | Rosenthal | 359/619 |
| 5,870,224 A * | 2/1999 | Saitoh et al. | 359/456 |
| 6,091,482 A * | 7/2000 | Carter et al. | 355/79 |
| 6,424,467 B1 * | 7/2002 | Goggins | 359/626 |
| 6,974,080 B1 * | 12/2005 | Goggins | 235/462.01 |
| 7,136,185 B2 * | 11/2006 | Goggins | 358/1.2 |
| 7,477,450 B2 * | 1/2009 | Abe | 359/455 |
| 7,639,426 B2 * | 12/2009 | Blondal et al. | 359/619 |
| 7,782,534 B1 * | 8/2010 | Booyens et al. | 359/619 |
| 2006/0227427 A1 * | 10/2006 | Dolgoff | 359/619 |
| 2008/0271351 A1 * | 11/2008 | Crawford | 40/454 |
| 2010/0254015 A1 * | 10/2010 | Booyens et al. | 359/619 |

FOREIGN PATENT DOCUMENTS
JP    05196807 A  *  8/1993
WO   WO 9323244 A1  *  11/1993

* cited by examiner

*Primary Examiner* — Stephen Meier
*Assistant Examiner* — Leonard S Liang
(74) *Attorney, Agent, or Firm* — MH2 Technology Law Group LLP

(57) ABSTRACT

Systems and methods of lenticular printing are disclosed. The systems and methods include an imaging device to process a lenticular image from two or more original images interlaced together. A printer of the imaging device prints the lenticular image on a substrate. A UV-cured gel deposition system of the imaging device is configured to deposit a UV-cured gel on the printed lenticular image to serve as a lenticular lens. The printing of the lenticular image and the depositing of the lenticular lens occurs concurrently to reduce the amount of manufacturing required to produce the lenticular device.

18 Claims, 4 Drawing Sheets

PRINTING LENTICULAR IMAGES AND LENSES ON PRINTERS WITH UV-CURED GEL DEPOSITION CAPABILITY

FIELD OF THE INVENTION

This invention relates to the field of printing and imaging devices, and more particularly to systems and methods for printing lenticular images and lenses.

BACKGROUND OF THE INVENTION

Lenticular printing is a printing technology in which a lenticular lens is used to produce images with the ability to change or produce the illusion of movement as the image is viewed from different angles. In particular, the technology can be used to simulate a morphing from one image to another, a motion clip, or a majority of scenes. The lenticular lens is created with an array of magnifying lenses that magnify different parts of the underlying image. Lenticular printing can be used in advertising, marketing, children's books, novelty items, security documents, and other mediums.

To accomplish the lenticular printing effect, two or more images are divided up into equal- or similar-width, narrow image strips. The created image strips from the multiple images are combined and interlaced into a single image so that, for example, a first strip of a first image is disposed first, followed by a first strip of a second image, followed by a second strip of the first image, and so on. The interlaced images can be printed on a document or other substrate. A lenticular array of lenses is bonded to the substrate such that individual lenses of the array are disposed over a pair of interlaced stripes. Light is reflected off each strip and refracted through the lenses in different directions, but with light from all strips of a given image refracted in the same direction. The produced effect is that one full image, or a combination all the image strips of an original image, is viewable when holding the bonded substrate from a certain angle, and another full image, or a combination of all the image strips of another original image, is viewable when holding the bonded substrate from a different angle. Different effects can be achieved by using more or less strips per lens and by altering the width and height of the lens.

Problems exist in the current lenticular systems and methods. In particular, the assembly of the final product usually involves multiple steps, namely, the images having to be processed and combined, and the lens sheet having to be made separately and later combined with the images, often by gluing. The multiple steps of conventional lenticular systems and methods results in increased manufacturing costs. Further, the final product is usually stiff and bulky due to the layering of components.

A need, therefore, exists for lenticular printing systems and methods that allow for easier manufacturing. Further, a need exists for lenticular printing systems and methods that allow for more flexible and manageable final products.

SUMMARY OF THE EMBODIMENTS

The following presents a simplified summary in order to provide a basic understanding of some aspects of one or more embodiments of the invention. This summary is not an extensive overview, nor is it intended to identify key or critical elements of the invention nor to delineate the scope of the invention. Rather, its primary purpose is merely to present one or more concepts in simplified form as a prelude to the detailed description presented later.

In accordance with the present teachings, a method of lenticular printing is provided. The method comprises receiving a lenticular image and printing the lenticular image on a substrate. A lenticular lens is deposited on the substrate, wherein the lenticular lens comprises a UV-cured gel.

In accordance with the present teachings, a method of lenticular printing is provided. The method comprises processing a lenticular image and sending the lenticular image to a printer for printing on a substrate. Further, the method comprises interfacing with a lenticular lens deposition system to cause the lenticular lens deposition system to deposit a lenticular lens on the substrate, wherein the lenticular lens comprises a UV-cured gel.

In accordance with the present teachings, a device for lenticular printing is provided. The device comprises a software application configured to process a lenticular image. Further, the device comprises a printer configured to interface with the software application to receive the processed lenticular image, print the processed lenticular image on a substrate, and deposit a lenticular lens on the substrate, wherein the lenticular lens comprises a UV-cured gel.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

Figure 1:
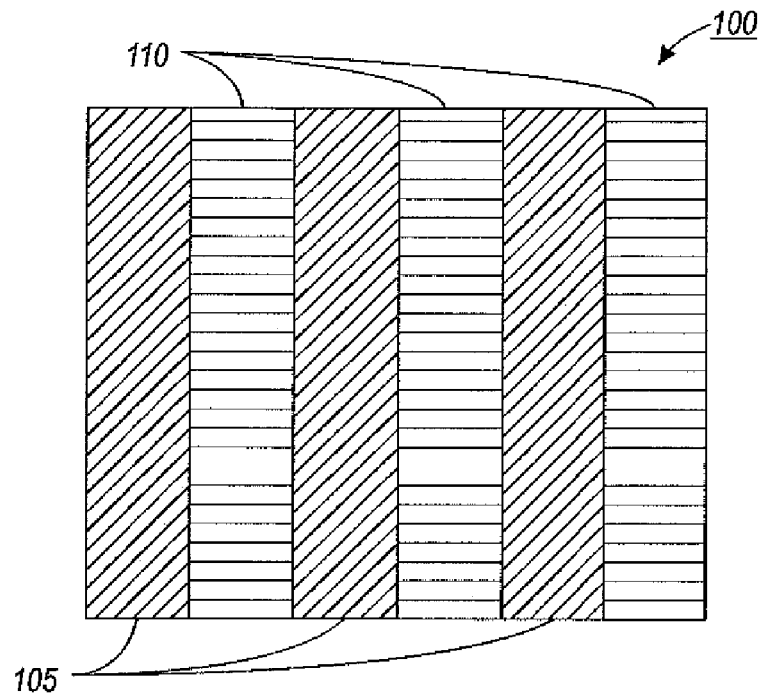
FIG. 1 depicts an exemplary lenticular image according to the present teachings.

It should be noted that some details of the drawings have been simplified and are drawn to facilitate understanding of the inventive embodiments rather than to maintain strict structural accuracy, detail, and scale.

DESCRIPTION OF THE EMBODIMENTS

Reference will now be made in detail to the present embodiments (exemplary embodiments) of the invention, an example of which is illustrated in the accompanying drawings. Wherever possible, the same reference numbers will be used throughout the drawings to refer to the same or like parts.

Various embodiments provide systems and methods for printing lenticular images and lenses. It should be appreciated that an imaging device can be used in the present embodiments. For example, the imaging device can be a multi-function imaging device including a scanner, printer, copier, fax, and other features used in imaging operations. In embodiments, a printer of the imaging device can be an ink jet printer or a laser printer. It should be appreciated that other similar imaging devices, printers, and the like can be used in the present embodiments, and can be combined or standalone entities.

The systems and methods described herein can produce lenticular images including interlaced strips of two or more original images, and lenticular lenses disposed on the lenticular images. For example, the imaging device can comprise a processor for executing imaging application software to create the lenticular images, and a printer for printing the lenticular images. Further, the systems and methods described herein can comprise an ultraviolet-(UV) cured gel deposition system that can deposit UV-cured gel on the lenticular images to serve as the lenticular lens. The application software, printer, and UV-cured gel deposition system can be combined or standalone entities, and/or part of the imaging device.

Material curing with respect to the present embodiments generally refers to thickening, hardening, or drying of a material brought about by heat, UV light, or chemicals. Further, curing to form a gel as described with respect to the present embodiments comprises providing a non-polymeric substance to be cured. For example, curing a gel can comprise determining an amount of desired cross-linking within the gel as a result of the curing. UV light can be applied at a selected intensity for a selected time period based on the determination of the amount of cross-linking desired within the substance to form the gel. It should be appreciated that other substances and forms of curing the substances are envisioned.

The disclosed systems and methods provide advantages over conventional lenticular printing systems and methods. For example, depositing the UV-cured gel as the lenticular lens removes the need to bond a plastic lenticular lens to a lenticular image. Further, using the same printer or imaging device to create the lenticular image and lens reduces the amount of manufacturing necessary to produce the lenticular device. Still further, printing the lenticular image and lens concurrently results in a thinly-layered product. Further benefits of the disclosed systems and methods include, but are not limited to, a fast and precise creation of lenticular devices, the creation of durable lenticular lenses that are well-secured to the printed substrate, reducing the ability to copy the finished product, and addressing new markets for low-cost animation and/or security.

Referring to FIG. 1, depicted is a lenticular image 100. In embodiments, imaging application software of an imaging device can process the lenticular image 100 and a printer of the imaging device can print the lenticular image 100. The lenticular image 100 can be printed on any type of document or substrate, and can be comprised of two or more interlaced original images. In embodiments, the lenticular image 100 can be printed as UV-cured ink. As shown in FIG. 1, the lenticular image 100 can comprise multiple strips of a first original image 105 and a second original image 110. In embodiments, the number of strips in the first original image 105 and the second original image 110 can vary depending on the size of the original images, the desired length of the lenticular image 100, the desired width of the strips, the size of a lenticular lens, and other factors.

As shown in FIG. 1, the strips of the first original image 105 and the strips of the second original image 110 can be interlaced such that the strips from the respective original images 105, 110 alternate. In particular, the first strip in the lenticular image 100 is a strip from the first original image 105, followed by a strip from the second original image 110, followed by another strip from the first original image 105, and so on. In embodiments, imaging application software on the imaging device or printer can process the lenticular image 100 using conventional systems and methods. For example, the imaging software can divide selected images into strips and interlace the strips to form the lenticular image 100. In embodiments, the lenticular image 100 can be processed according to set criteria, such as, for example, the size of the original images 105, 110 or the lenticular image 100, and other factors. In embodiments, the lenticular image can be saved in memory, a database, or similar storage devices.

Figure 2:
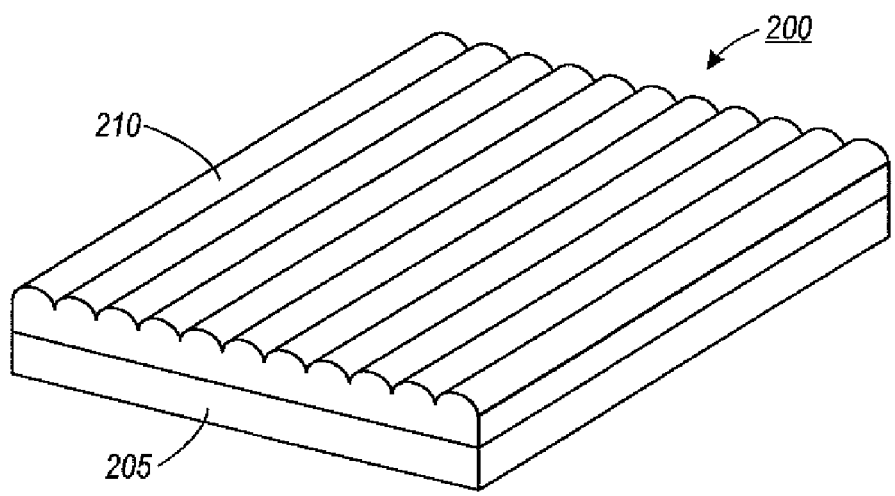
FIG. 2 depicts an exemplary lenticular system according to the present teachings.

Referring to FIG. 2, depicted is a lenticular device 200 according to the present embodiments. The lenticular device 200 can comprise a lenticular image 205, or array, and a lenticular lens 210. The lenticular image 205 can be printed on a substrate and can comprise strips of two or more images interlaced together, as described herein. The lenticular lens 210 can be disposed on the lenticular image 205, and the lenticular image 205 can be viewable through the lenticular lens 210. Further, as shown in FIG. 2, the lenticular lens 210 can be a series of cylindrical lenses that can be disposed as parallel rib-like rows, individually referred to as lenticules.

Figure 3:
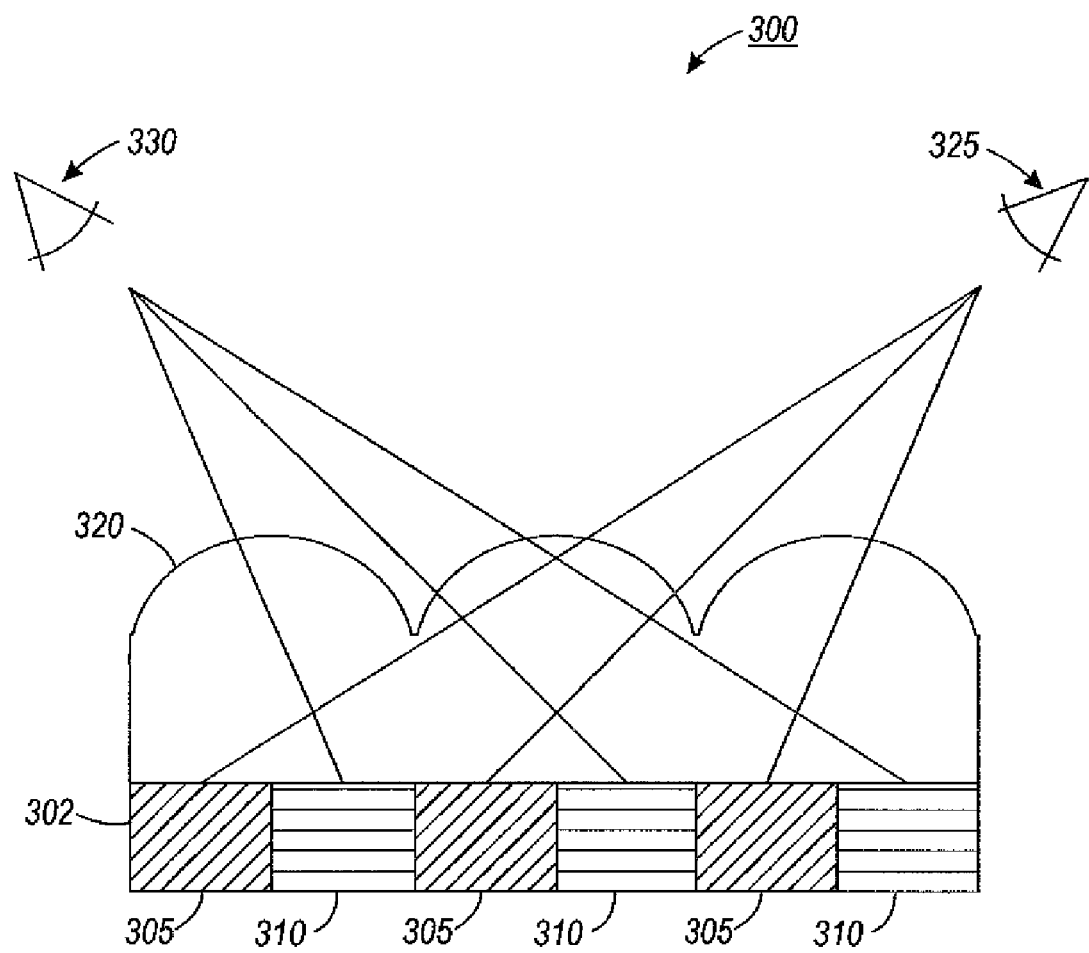
FIG. 3 depicts a cross-section of an exemplary lenticular system according to the present teachings.

Referring to FIG. 3, depicted is a cross-section of a lenticular device 300. The lenticular device 300 includes an image plane 302 including strips of two images, in particular image A 305 and image B 310, which can be printed on a substrate as described herein. The lenticular system 300 further comprises a lenticular lens 320 disposed on the images A and B 305 and 310. The individual lenticules of the lenticular lens 320 can have a focal length equal to a thickness of the lenticular lens 320. However, it should be appreciated that the focal length of the lenticular lens 320 can be based on other factors.

The lenticular device 300 can display different images depending on a viewing angle. For example, the viewing angle of the lenticular device 300 can be the range of angles within which an observer can view the underlying image. Further, the viewing angle of the lenticular device 300 can be determined by the maximum angle at which a light ray can exit a corresponding lenticule of the lenticular lens 320. As shown in FIG. 3, the images A and B 305 and 310 can each be viewed at different viewing angles above the lenticular lens 320. In particular, the image A 305 can be viewed at a first viewing angle 325 and the image B 310 can be viewed at a second viewing angle 330. For example, when a viewer is positioned at viewing angles 325 or 330, the viewer can see a magnified version of the individual strips of the images A or B 305 or 310, which can appear to combine to form the full image. It should be appreciated that the image positioning and viewing angles as depicted in FIG. 3 are merely exemplary and can vary depending on factors such as materials, thicknesses, curvature, and other factors.

The complexity of the lenticular image can increase as more underlying images are used. In cases where there are two original images in the lenticular image, the original images can be the same size, and can be either related or unrelated to each other. As the number of original images in the lenticular image increases, the creator of the lenticular image may desire to have a continuity or relatedness among the images because a lenticular image including several images can appear as an animation-like effect when viewed through a lenticular lens.

The number of original images in a lenticular image can be partly dependent on the size of the lenticular image. For example, smaller lenticular images can have more underlying original images because the angle of view can change little from one viewing side to the other. Similarly, in larger lenticular images, the angle of view can vary substantially across the face of the lenticular image, and therefore the strips of the underlying images can be wider to prevent "ghosting," the term given for when a viewer can see strips from more than one original image.

The individual lenticules of the lenticular lens 320 can be aligned with the strips of the individual images A and B 305 and 310. For example, as shown in FIG. 3, each lenticule of the lenticular lens 320 can cover one strip each of images A and B 305 and 310. Therefore, light reflected off each strip can be refracted in a slightly different direction, but so that light from all strips of a respective underlying image is refracted in the same direction. For example, all the strips corresponding to image A 305 can be viewable from the first viewing angle 325 and all the strips corresponding to image B 310 can be viewable from the second viewing angle 330. In other words, the complete image A 305 can be viewed by a viewer positioned at the first viewing angle 325 and the complete image B can be viewed by a viewer positioned at the second viewing angle 330.

Referring back to FIG. 2, in conventional lenticular systems and methods, the lenticular lens 210 can be formed by molding a sheet of plastic into cylindrical lenses in parallel rib-like rows. The lenticular image 205 can be printed on paper or another substrate, and in a separate step, the lenticular lens 210 can be molded to the printed lenticular image 205. Problems exist in the printing of conventional lenticular systems. In particular, the assemblage of the final product is a multistep process because the processing and printing of the original images, and the manufacturing and molding of the lens sheet are accomplished separately. Further, the final product can be bulky and stiff due to the layering of components. These problems can drive up cost of lenticular systems and methods, and limit their application to a wider market.

In the disclosed systems and methods, the lenticular system can be produced more cheaply and efficiently. In particular, in the present embodiments, the lenticular lens 210 can be formed of a UV-cured gel, while still having the same or similar visual properties as conventional lenticular lenses. The UV-cured gel can be any material that reacts when exposed to UV radiation such as material including, for example, silanes, siloxanes, silcarbanes, and silcarbane siloxanes which contain at least one silicon atom. In embodiments, UV lamps can be used to cure the gel to convert the gel from a liquid form to a gel form. The UV lamps can emit UV light at various intensities such as, for example, in a range of about 100 W/cm$^2$ to about 600 W/cm$^2$.

The UV-cured gel can be used to create the lens during the printing process. For example, a printer of an imaging device can print a lenticular image, and a UV-cured gel deposition system of the imaging device can dispose a lenticular lens including UV-cured gel on the lenticular image. The printer can be a combined component with the UV-cured gel deposition system, or the printer can be separate from the UV-cured gel deposition system. Upon the UV-cured lenticular lens being deposited on the lenticular image, the product can be transported for stacking and finishing. In embodiments, the imaging device can execute software configured to process original images to create a lenticular image, as described herein. Further, the software can be coupled to memory, the printer, and the UV-cured gel deposition system to provide data relating to the printing of the lenticular image and the lenticular lens.

Figure 4:
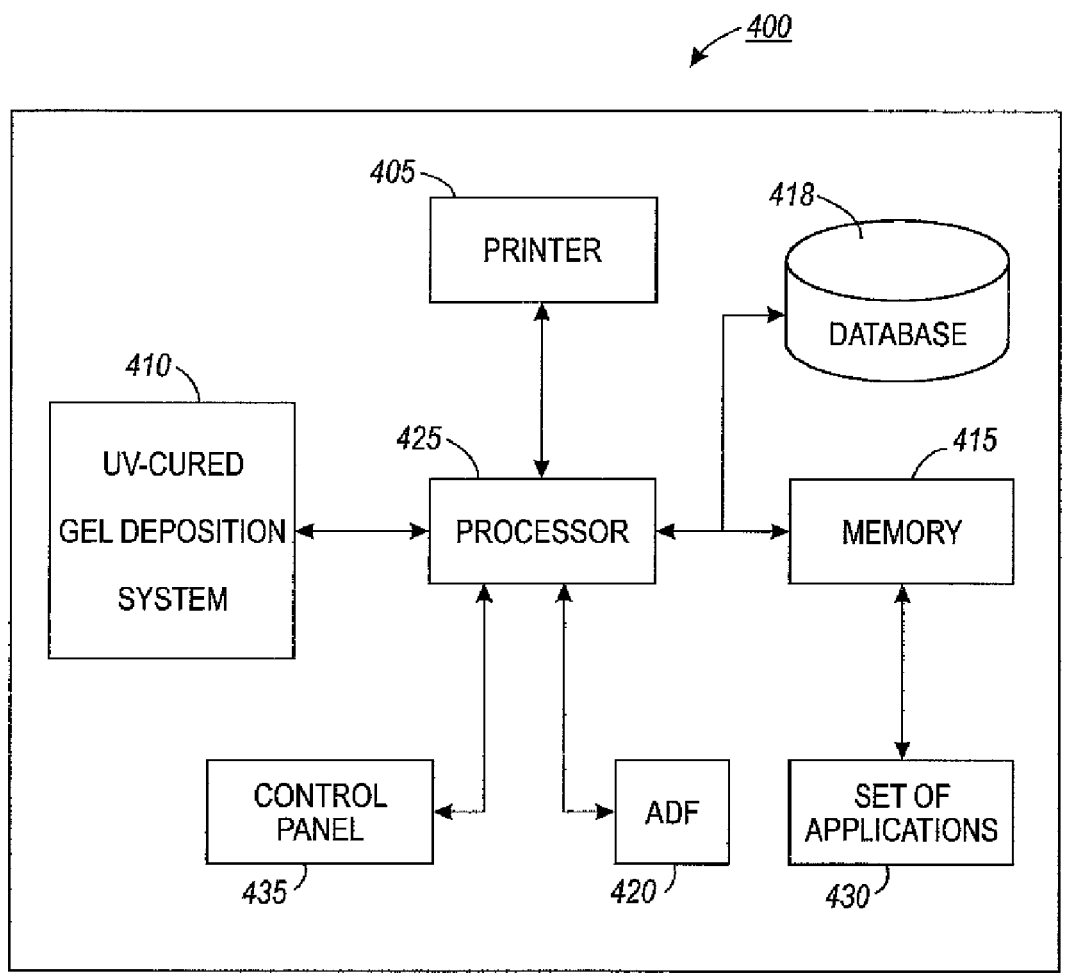
FIG. 4 depicts an exemplary block diagram of an imaging device according to the present teachings.

FIG. 4 depicts an exemplary block diagram of an imaging device 400. The imaging device 400 generally refers to a dual-mode imaging device that can print, copy, fax, scan, and perform similar operations. However, it should be appreciated that the imaging device 400 can be a standalone device capable of handing the functions associated with lenticular printing, as described herein. Generally, these devices also include a network connection, either a local area connection (LAN) such as an Ethernet interface, or a modem that can connect to a phone line (not shown in figures).

The imaging device 400 can comprise a printer 405, a UV-cured gel deposition system 410, a memory 415, and an automatic document feeder (ADF) 420. The printer 405 can print documents such as lenticular images on various substrates, consistent with embodiments described herein. The UV-cured gel deposition system 410 can comprise one or more UV lamps and can deposit UV-cured gel on a printed document. In embodiments, the deposited UV-cured gel can serve as a lenticular lens.

The printer 405 and the UV-cured gel deposition system 410 can receive data from or save data to the memory 415 and/or a database 418. The ADF 420 can transport pages of documents throughout the imaging device 400. For example, the ADF 420 can transfer a document from an output tray of the printer 405 to a tray associated with the UV-cured gel deposition system 410. For further example, the ADF 420 can transport the printed lenticular device to a component for stacking and/or finishing. It should be appreciated that the printer 405 and the UV-cured gel deposition system 410 can be combined into the same component or entity.

The imaging device 400 can further comprise a processor 425 and a set of applications 430. The set of applications 430 can be initiated by a user, operator, or the like and can execute on the processor 425 to direct the functions of the imaging device 400 and components thereof, as described herein. For example, the set of applications 430 in combination with the processor 425 can obtain or retrieve lenticular image data from the memory 415 and send the retrieved data to the printer 405. For further example, the set of applications 430 can create a lenticular image from two or more original images, and can direct the UV-cured gel deposition system 410 to deposit a lenticular lens on a substrate, according to the present embodiments.

The processor 425 can be coupled to a control panel 435 including, for example, a touchpad or series of buttons which can allow a user a control and a user-readable setup and status screen. In embodiments, a graphical user interface associated with the set of applications 430 can display on the control panel 435. In use, the user can select one or more functions from a number of different functions provided by the imaging device 400 through the use of the control panel 435. For example, the user can select to print a lenticular image and/or a lenticular lens from the imaging device 400 via the control panel 435.

The set of applications 430 can further direct the printer 405 to work in unison with the UV-cured gel deposition system 410 to create the lenticular device. For example, the set of applications 430 can direct the UV-cured gel deposition system 410 to deposit a lenticular lens on a lenticular image upon the printer 405 printing the lenticular image, or while the printer 405 is printing the lenticular image.

Figure 5:
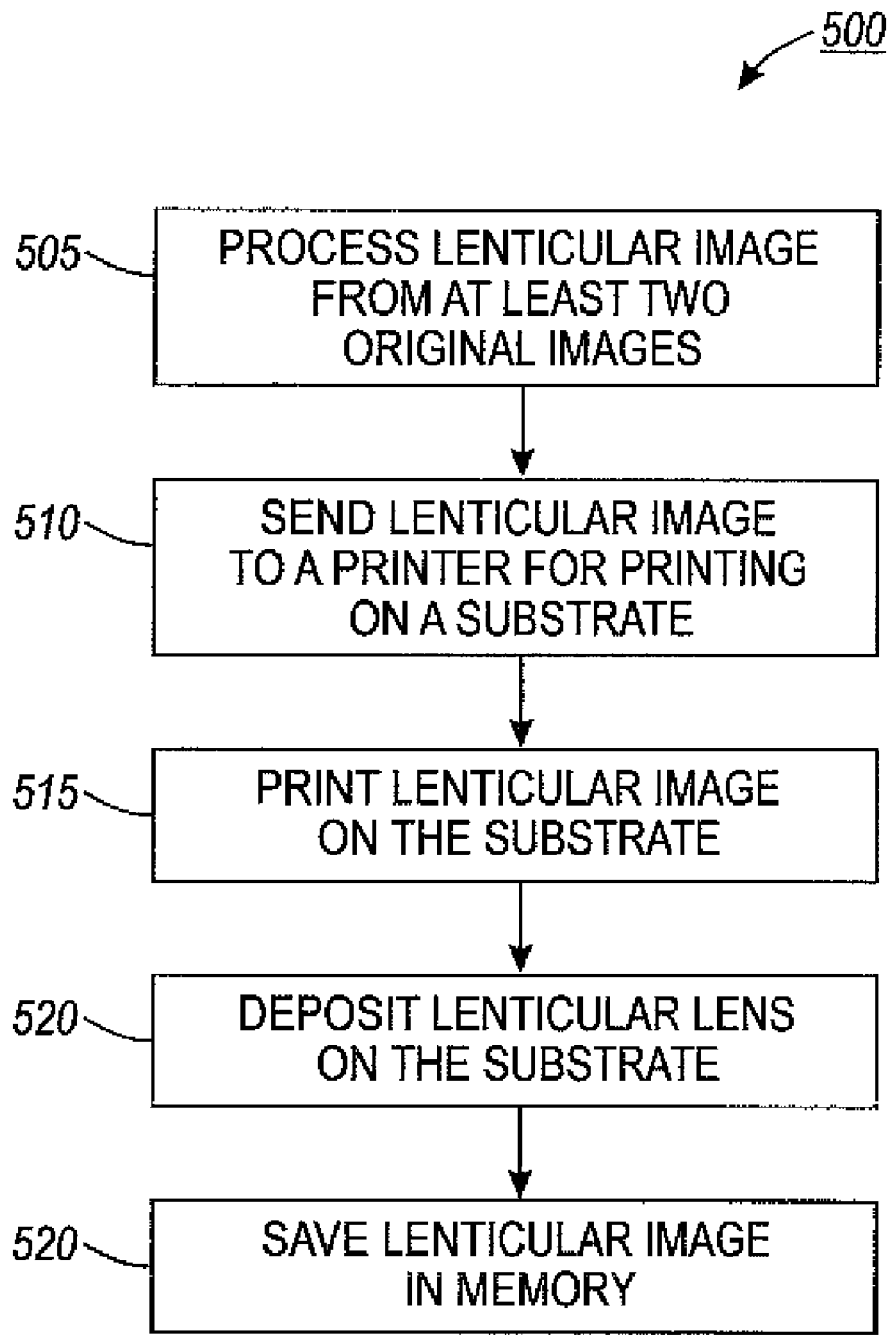
FIG. 5 depicts an exemplary flow diagram of lenticular printing according to the present teachings.

Referring to FIG. 5, a present embodiment for an exemplary method 500 for lenticular printing is depicted. It should be appreciated that the mechanical and electronic components of the imaging device 400 as described with respect to FIG. 4 can perform the steps of the method 500 such as, for example, the processor 425, the UV-cured gel deposition system 410, the memory 415, the ADF 420, the set of applications 430, and other components.

In 505, a lenticular image can be processed from at least two original images. In embodiments, a software application can detect the at least two original images, divide the original images into multiple strips, and interlace the multiple strips of the original images to create the lenticular image. In 510, the lenticular image can be sent to a printer for printing on a substrate. The printer can be coupled to the software application and/or memory to receive the necessary data. In 515, the printer can print the lenticular image on the substrate.

In 520, a lenticular lens can be deposited on the substrate. In embodiments, the lenticular lens can comprise a UV-cured gel, and can be deposited from a UV-cured gel deposition system. Further, the lenticular lens can be formed with parallel-ribs as the lens is deposited. Still further, in embodiments, the UV-cured gel deposition system can deposit the lenticular lens on the lenticular image upon the printer printing the lenticular image, or while the printer is printing the lenticular image. In 525, the lenticular image can be saved in memory. For example, the printer and/or software application can send lenticular image data to memory, storage, a database, and/or the like.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of lenticular printing using an imaging device having a processor for executing imaging application software to create a lenticular image, comprising:
    interlacing, by the imaging device, at least two images to produce an interlaced image;
    printing, by a printer of the imaging device, the interlaced image onto a substrate; and
    depositing, by the printer of the imaging device, a lenticular lens onto the interlaced image printed on the substrate to form a lenticular image, wherein the lenticular lens comprises a UV-cured gel.

2. The method of claim 1, wherein lenticules of the lenticular lens are aligned with strips of the interlaced image.

3. The method of claim 1, wherein interlacing the at least two images to produce the interlaced image comprises:
    receiving at least two original images;
    dividing the at least two original images into multiple strips; and
    interlacing the multiple strips of the at least two original images to form the interlaced image.

4. The method of claim 1, further comprising:
    saving the interlaced image in memory.

5. The method of claim 1, further comprising depositing the lenticular lens from a UV-cured gel deposition system.

6. The method of claim 5, wherein the UV-cured gel deposition system comprises one or more UV lamps.

7. The method of claim 1, further comprising printing the interlaced image onto the substrate using a UV-cured ink.

8. A method of lenticular printing using an imaging device having a processor for executing imaging application software to create a lenticular image, comprising:
    interlacing, by the imaging device, at least two images to process an interlaced image;
    storing the interlaced image in memory of the imaging device;
    sending the stored interlaced image from the memory to a printer of the imaging device;
    printing the interlaced image on a substrate using the printer of the imaging device;
    depositing, by the printer of the imaging device, a lenticular lens onto the interlaced image printed on the substrata, wherein the lenticular lens comprises a UV-cured gel.

9. The method of claim 8, further comprising aligning lenticules of the lenticular lens with strips of the interlaced image.

10. The method of claim 8, wherein interlacing the at least two images comprises:
    detecting at least two original images;
    dividing the at least two original images into multiple strips; and
    interlacing the multiple strips of the at least two original images to form the interlaced image.

11. The method of claim 8, further comprising printing the interlaced image onto the substrate with a UV-cured ink.

12. A device for lenticular printing, comprising:
    a software application configured to form a lenticular image;
    a processor configured to execute the software application; and
    a printer configured to:
        interface with the software application to receive an interlaced image;
        print the interlaced image on a substrate using a printer of the device; and
        deposit a lenticular lens onto the interlaced image printed on the substrate using the printer of the device, wherein the lenticular lens comprises a UV-cured gel.

13. The device of claim 12, wherein lenticules of the lenticular lens are aligned with strips of the printed interlaced image.

14. The device of claim 12, wherein to form the lenticular image, the software application is further configured to detect at least two original images, divide the at least two original images into multiple strips, and interlace the multiple strips of the at least two original images to form the interlaced image.

15. The device of claim 12, further comprising memory configured to store the interlaced image.

16. The device of claim 12, wherein the printer comprises a UV-cured gel deposition system configured to deposit the lenticular lens onto the interlaced image printed on the substrate.

17. The device of claim 16, wherein the UV-cured gel deposition system comprises one or more UV lamps.

18. The device of claim 12, wherein the printed interlaced image comprises a UV-cured ink.

* * * * *